(12) United States Patent
Massoptier-David et al.

(10) Patent No.: US 10,239,270 B2
(45) Date of Patent: Mar. 26, 2019

(54) SEGMENTED MOLD FOR A TIRE AND RELATED MOLDING METHOD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Mickael Massoptier-David, Clermont-Ferrand (FR); Thomas Simonelli, Clermont-Ferrand (FR); Gilles Walrand, Clermont-Ferrand (FR)

(73) Assignees: Compagnie Generale Des Etablissements Michelin, Clermont-Ferrand (FR); Michelin Recherche Et Technique, S.A., Granges-Paccot (CH)

(*) Notice: Subject to any disclaimer, the term of this patent is extended or adjusted under 35 U.S.C. 154(b) by 272 days.

(21) Appl. No.: 15/101,503

(22) PCT Filed: Nov. 28, 2014

(86) PCT No.: PCT/EP2014/075888
§ 371 (c)(1),
(2) Date: Jun. 3, 2016

(87) PCT Pub. No.: WO2015/082323
PCT Pub. Date: Jun. 11, 2015

(65) Prior Publication Data
US 2016/0318268 A1    Nov. 3, 2016

(30) Foreign Application Priority Data
Dec. 4, 2013    (FR) ...................... 13 62060

(51) Int. Cl.
*B29D 30/06*    (2006.01)

(52) U.S. Cl.
CPC .. *B29D 30/0629* (2013.01); *B29D 2030/0631* (2013.01); *B29D 2030/0677* (2013.01);
(Continued)

(58) Field of Classification Search
CPC ........ B29D 30/0629; B29D 2030/0631; B29D 2030/0677
See application file for complete search history.

(56) References Cited

U.S. PATENT DOCUMENTS 3,609,819 A * 10/1971 Searle ................ B29D 30/0629
425/22
3,797,979 A    3/1974 Greenwood
(Continued)

FOREIGN PATENT DOCUMENTS

DE    1088811 A1    7/1969
EP    522374 A1    1/1993
(Continued)

*Primary Examiner* — James P Mackey
(74) *Attorney, Agent, or Firm* — Dickinson Wright PLLC (57) ABSTRACT

A mold for a tire is disclosed herein. The mold includes first and second shells mold-able to lateral sidewalls of the tire, and a plurality of sectors that are distributed in the circumferential direction and are mold-able to the tread of said tire. The sectors are radially movable between an open position and a closed position of the mold. The mold also comprises at least one spacing interposed between each sector and each shell in order to keep said sector and the shells spaced apart in the radial direction in the closed position of the mold, such that the shells and the sectors are in contact in the radial direction only by way of the spacing. The spacing is also able to limit the heat transfer between the shells and the sectors in said closed position.

15 Claims, 5 Drawing Sheets

(52) U.S. Cl.
CPC ...... *B29K 2905/02* (2013.01); *B29K 2905/12* (2013.01); *B29K 2995/0015* (2013.01)

(56) References Cited

U.S. PATENT DOCUMENTS

| | | | |
|---|---|---|---|
| 4,568,259 A | | 2/1986 | Mattson |
| 5,234,326 A | * | 8/1993 | Galli ........................ B29C 33/10 |
| | | | 425/46 |
| 5,269,669 A | * | 12/1993 | Ladouce ............ B29D 30/0629 |
| | | | 249/57 |
| 8,597,008 B1 | | 12/2013 | Rex et al. |
| 9,731,462 B2 | * | 8/2017 | Marchadier ........ B29D 30/0629 |
| 2008/0277815 A1 | | 11/2008 | Kaneda |
| 2010/0140847 A1 | * | 6/2010 | Secchi ............... B29D 30/0605 |
| | | | 264/334 |
| 2012/0111464 A1 | | 5/2012 | Kimiya |

FOREIGN PATENT DOCUMENTS

| | | |
|---|---|---|
| EP | 0 701 894 A2 | 7/1995 |
| EP | 2040911 | 1/2008 |
| EP | 2 000 290 A1 | 12/2008 |
| GB | 758816 | 10/1956 |
| WO | 2008/009724 A1 | 1/2008 |

\* cited by examiner

SEGMENTED MOLD FOR A TIRE AND RELATED MOLDING METHOD

CROSS-REFERENCE TO RELATED APPLICATION

This application is a 371 national phase entry of PCT/EP2014/075888, filed 28 Nov. 2014, which claims the benefit of French Patent Application No. 1362060, filed 4 Dec. 2013, the contents of which are incorporated herein by reference for all purposes.

BACKGROUND

The aspects disclosed herein relate to the field of molds for curing or vulcanizing vehicle tires, and more particularly molds of the sectored type.

This type of mold mainly includes two shells that each mold one of the lateral sidewalls of the tire, a plurality of sectors that mold the tread of said tire and are radially movable between an open position and a closed position of the mold, and at least one clamping ring for allowing the sectors to move radially.

The shells and the sectors define an inner space that is intended to be brought into contact with the unvulcanized green form of tire. For more details concerning such a type of sectored mold, reference may be made for example to the documents DE 1 808 811, U.S. Pat. No. 3,797,979, EP-A2-0 701 894 and EP-B1-2 040 911.

The manufacturing of the tire, and more particularly the vulcanization phase, requires that a pressure is applied to the green tire in order to press it against the internal faces of the mold and that heat is supplied to the mold. It is also known practice to heat the mold by electrical induction and/or by magnetic induction. It is also known practice to heat the mold by means of a heat-transfer fluid such as pressurized water vapour.

In order to optimize the curing of the tire, one solution consists in heating the two shells of the mold to and keeping them at a temperature different from that to which the sectors are heated.

However, in the closed position of the mold, each shell is generally provided to bear directly against the sectors in the radial direction. Such instances of contact promote heat transfer by conduction inside the mold, between the sectors and the shells. This can be incompatible with optimal curing of the tire.

Also known, from the Patent EP-B1-0 522 374, is a sectored mold that also comprises two lateral rings that are fastened to the sectors and bear radially against the shells in the closed position. Such rings aim to avoid the occurrence of molding burrs on the manufactured tires and are made of steel, like the sectors and the shells, such that only steel parts come into contact when the mold is closed.

This solution also promotes heat transfer by conduction between the sectors and the shells and also a uniform distribution of the temperature in the mold.

SUMMARY

The aspects disclosed herein aim to remedy these drawbacks.

More particularly, the present disclosure aims to provide a sectored mold that makes it possible to be able to stably keep the shells and the sectors at different temperature levels during the curing phase of the tire.

In one embodiment, the mold is intended for a tire of the type comprising a tread and two lateral sidewalls. The mold comprises first and second shells that are intended to mold the lateral sidewalls of the tire, and a plurality of sectors that are distributed in the circumferential direction and are intended to mold the tread of said tire. The sectors are radially movable between an open position and a closed position of the mold. The mold also comprises at least one spacing means interposed between each sector and each shell in order to keep said sector and the shells spaced apart in the radial direction in the closed position of the mold, such that the shells and the sectors are in contact in the radial direction only by way of the spacing means. Said spacing means are able to limit the heat transfer between the shells and the sectors in the closed position of the mold.

The mounting of at least one such spacing means, which is interposed between each sector and each shell, makes it possible to limit heat transfer by conduction between these parts of the mold during the curing of the tire. It is thus possible to keep the shells and the sectors at different temperatures so as to maintain a non-uniform temperature distribution inside the mold. This makes it possible to be able to optimize the curing of the tire. The spacing means are separate from the shells and the sectors.

In one embodiment, each spacing means is made at least in part of thermally insulating material having a thermal conductivity lower than that of the materials of the sectors and of the shells.

Advantageously, each spacing means comprises a spacing part made in the form of a section of a ring and the spacing means are disposed such that the spacing parts form at least one ring between the sectors and each shell.

In one embodiment, said spacing part internally delimits at least one cavity. Preferably, said cavity is delimited in the radial direction by an inner wall and an outer wall of the spacing part, said walls being mounted in contact with the associated shell and with the associated sector.

The presence of at least one cavity in the spacing part makes it possible to limit the flow cross sections of a heat flux over the spacing means. Thus, the propagation of the heat through the spacing means is limited further. The air present in the cavity or cavities increases the insulating properties of the spacing means.

Alternatively or in combination, the mold can also comprise means for supplying cooling fluid to the cavity and means for the outlet of said fluid so as to obtain a flow of the cooling fluid along said cavity.

A flow of cooling fluid in the cavity of each spacing means can also be provided so as to limit the heat transfer between the sectors and the shells inside the mold during the curing of the tire.

In one embodiment, each spacing means comprises at least one fastening part extending substantially radially from the spacing part inside a hole formed in the associated sector or in the associated shell. The mold can comprise a fastening means that is mounted in said hole and extends inside said fastening part.

Preferably, each spacing means is radially in contact on one side with the associated shell and radially in contact on the other side with the associated sector. Each spacing means can comprise a contact face for contact with the tire in the closed position of the mold.

Advantageously, each spacing means is made of a non-metal material, notably of a composite material. Alternatively, each spacing means can be made of a metal material, notably of titanium.

In one embodiment, each sector comprises a support and a mold fitting fastened to said support. The spacing means can be fastened to the sectors and retain the mold fittings on the supports.

The mold can also comprise at least one clamping ring that cooperates with outer faces of the sectors.

The invention also relates to a method for molding a tire with the aid of a mold as defined above, wherein the two shells are heated to a temperature different from that to which the sectors of the mold are heated.

BRIEF DESCRIPTION OF THE DRAWINGS

The present invention will be understood better from reading the detailed description of embodiments considered by way of entirely non-limiting example and illustrated by the appended figures, in which.

DETAILED DESCRIPTION

Figure 1:
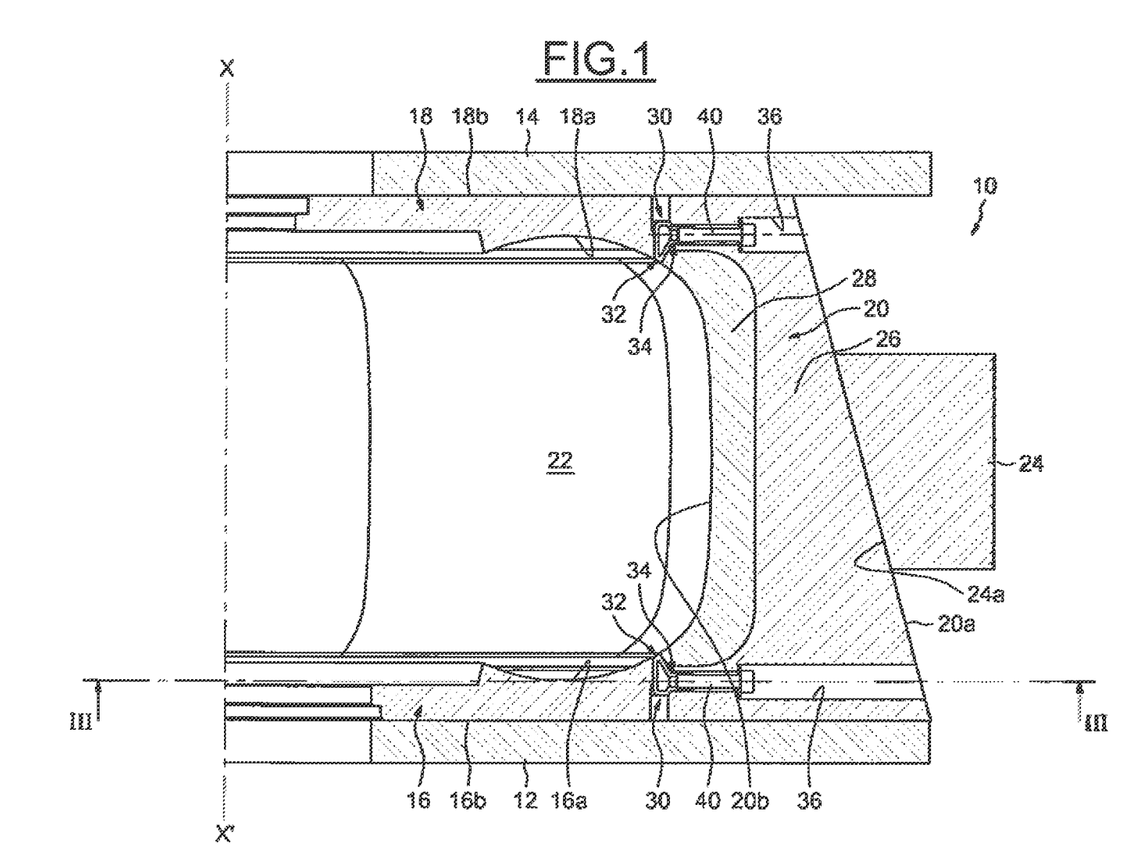
FIG. 1 is a half view in cross section of a sectored mold for a tire according to a first exemplary embodiment of the invention in a closed position of said mold.

FIG. 1 shows an exemplary embodiment of a sectored mold, bearing the overall reference 10, provided for the curing or vulcanization of an annular tire that comprises a cylindrical tread extended by first and second opposite lateral sidewalls. The tire is for a motor vehicle which can be for example a passenger car, a utility vehicle or a vehicle of the heavy goods type. In FIG. 1, the mold 10 is illustrated in a position assumed to be vertical. The mold 10 has an axis X-X' of symmetry which is coincident with the axis of revolution of the tire.

The mold 10 comprises lower and upper plates 12, 14, a lower and an upper annular shell 16, 18 mounted so as to bear against the plates, axially facing the latter, and a ring of sectors 20 that are disposed axially between the plates 12, 14 and radially surround the shells 16, 18. The shells 16, 18 and the sectors 20 are centred on the axis X-X'. The sectors 20 are distributed circumferentially around said axis. In the exemplary embodiment illustrated, the sectors 20 are identical to one another and there are nine thereof. The sectors 20 are radially movable between a moved-together position with respect to the shells 16, 18, as illustrated in FIG. 1, corresponding to a closed position of the mold 10, and a spaced-apart, open position of said mold. In the closed position, the shells 16, 18 and the plurality of sectors 20 jointly delimit an impression 22 of the tire. The closed position of the mold 10 corresponds to the molding position of the tire.

The mold 10 also comprises a clamping ring 24 that is secured to the upper plate 14 and comprises an inner face 24a with a frustoconical shape that bears radially against a complementary outer face 20a of each sector. In a manner known per se, each sector 20 is connected to the clamping ring 24 by way of a slide (not shown) such that an axial movement of said ring causes the radial movement of the sectors 20 between the closed position and the open position of the mold, or vice versa.

Each shell 16, 18 comprises an internal annular face 16a, 18a for molding the lateral sidewalls of the tire. The internal face 16a axially faces the opposite internal face 18a. The internal faces 16a, 18a are mutually symmetrical with respect to a radial median plane of the mold 10. A radial external face 16b, 18b of each shell is mounted so as to bear axially against a radial internal face of the associated plate 12, 14. The external face 16b, 18b of each shell is axially on the opposite side from the internal face 16a, 18a. Each plate 12, 14 forms a support plate for the associated shell 16 or 18. Each plate 12, 14 is situated axially on the opposite side from the impression 22 delimited by the shells 16, 18 and the sectors 20. Each sector 20 also comprises an inner face 20b, radially on the opposite side from the frustoconical outer face 20a, in order to mold the tread of the tire. In the description, the terms "internal" and "external" are used to define an orientation in the radial direction, while the terms "inner" and "outer" are used to define an orientation in the axial direction.

The mold 10 also comprises a lower and an upper annular bead ring (not shown) that are mounted so as to bear against the shells 16, 18 in order to mold the lateral beads of the tire. The bead rings can be attached parts that are fastened to the shells 16, 18 or be produced in one piece with said shells.

In the exemplary embodiment illustrated, each sector 20 comprises a support 26 that delimits the outer face 20a in contact with the clamping ring 24, and a mold fitting 28 that is fastened to the support and delimits the inner face 20b bearing the impression of the tread of the tire. The mold fitting 28 is situated radially on the inner side of the support 26. The support 26 can be made of a metal material, notably of steel, and the mold fitting 28 of aluminium. The shells 16, 18 can be made of a metal material, notably of steel.

The mold 10 also comprises a plurality of spacing means 30 interposed between the sectors 20 and the shells 16, 18 in order to keep them spaced apart in the radial direction in the closed position of said mold. Each sector 20 supports two spacing means 30. Each spacing means 30 is fastened to one lateral end of the associated sector 20 and bears radially against the associated shell 16, 18 in the closed position of the mold 10. The spacing means 30 are disposed relative to one another so as to form an upper and a lower ring that are interposed radially between the sectors 20 and the shells 16, 18. The spacing means 30 are identical to one another.

In order to limit heat transfer by conduction between the sectors 20 and the shells 16, 18 in the closed position of the mold, each spacing means 30 is made of a thermally insulating material which has a thermal conductivity lower than the thermal conductivity of each of the materials of the sectors 20 and lower than the thermal conductivity of the material of the shells 16, 18. Advantageously, the spacing means 30 are made of a metal material such as titanium, or of a composite material. The spacing means 30 fulfil a double function, namely that of maintaining a spacing in the radial direction between the sectors 20 and the shells 16, 18 and that of limiting heat transfer by conduction between these elements in the closed position of the mold 10.

Figure 3:
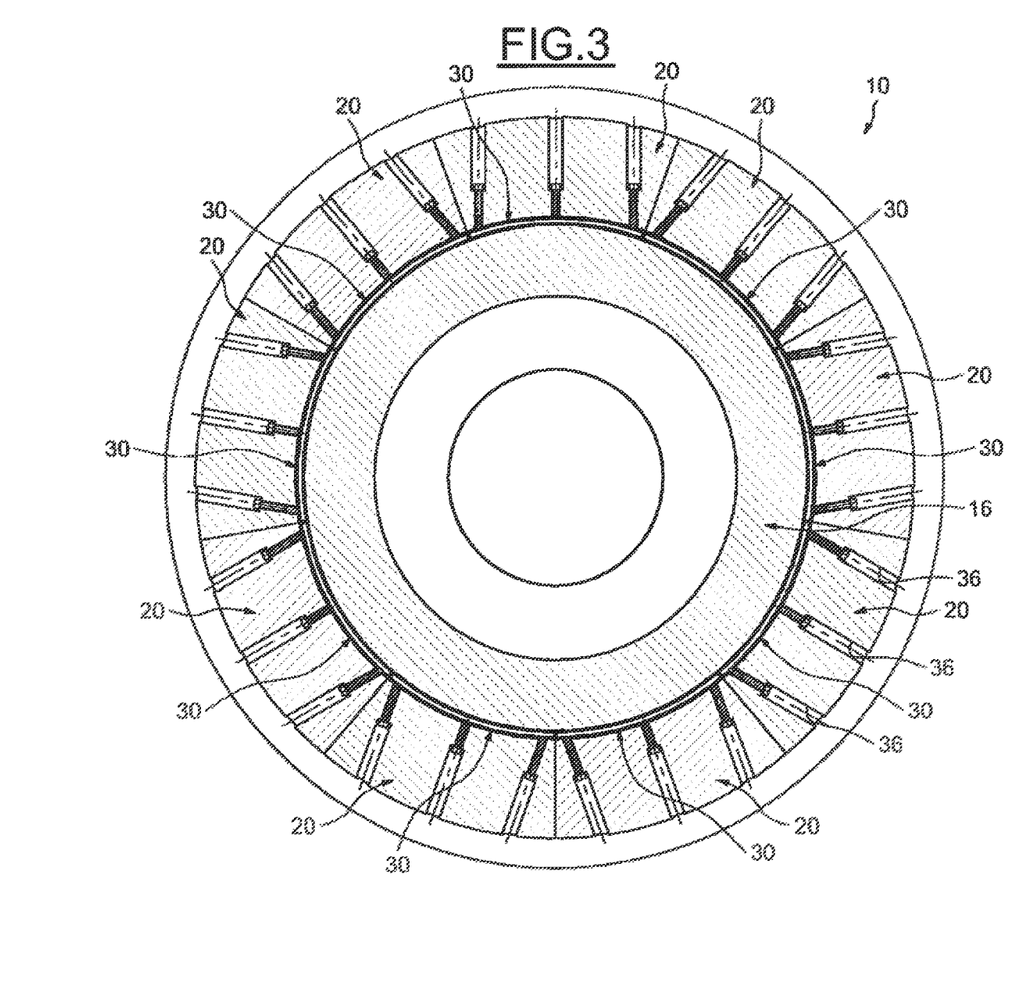
FIG. 3 is a cross-sectional view on the axis III-III in FIG. 1.
Figure 4:
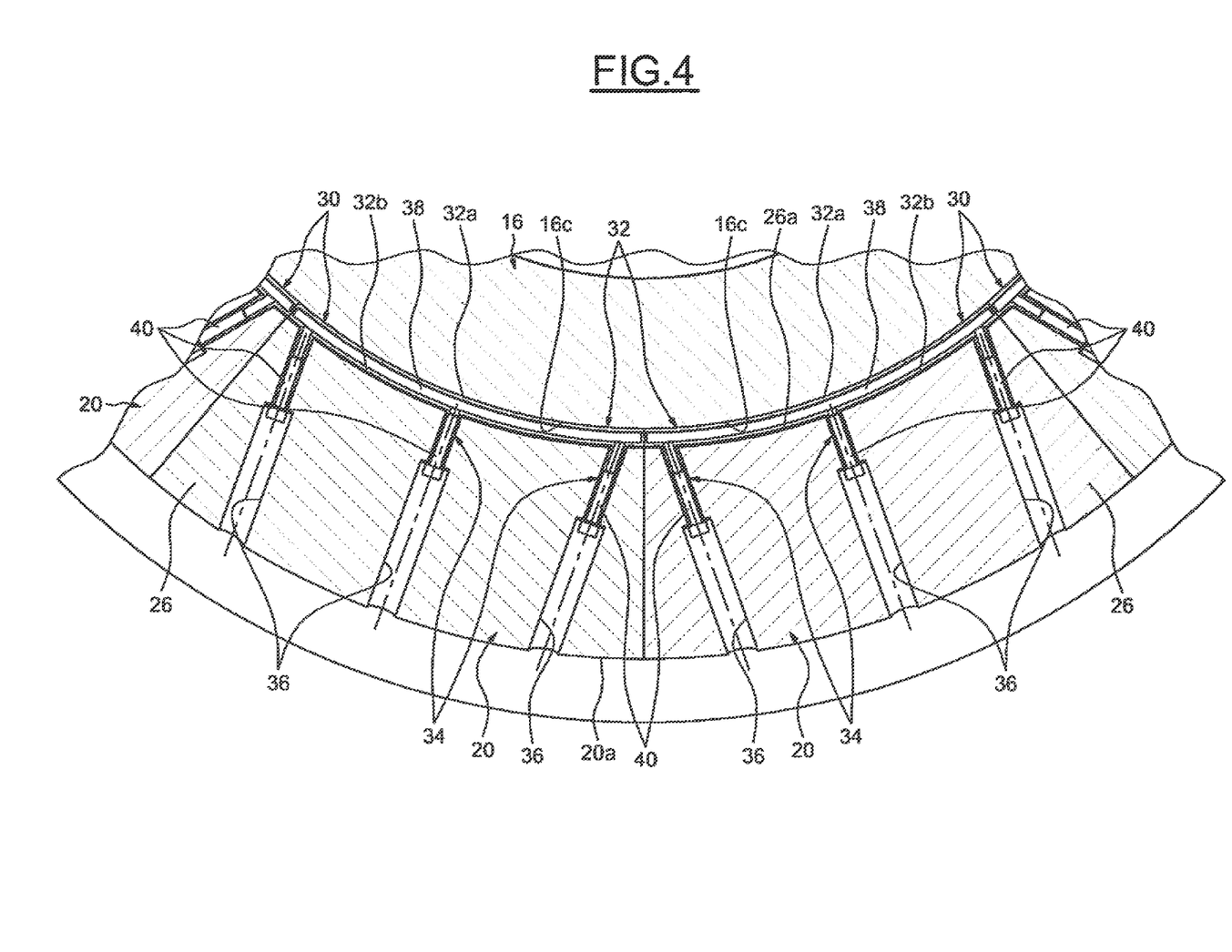
FIG. 4 is a detail view of FIG. 3.

Each spacing means 30 comprises a spacing part 32 interposed radially between the associated sector 20 and the shell 16 or 18, and fastening parts 34 extending radially towards the outside, each inside a hole 36 made in the thickness of said sector. Each spacing part 32 has a curved or bent shape and is made in the form of a section of a ring that extends circumferentially (FIGS. 3 and 4). In the closed position of the mold 10, each spacing part 32 is radially in contact on one side with the associated sector 20 and radially in contact on the other side with the shell 16 or 18.

Figure 2:
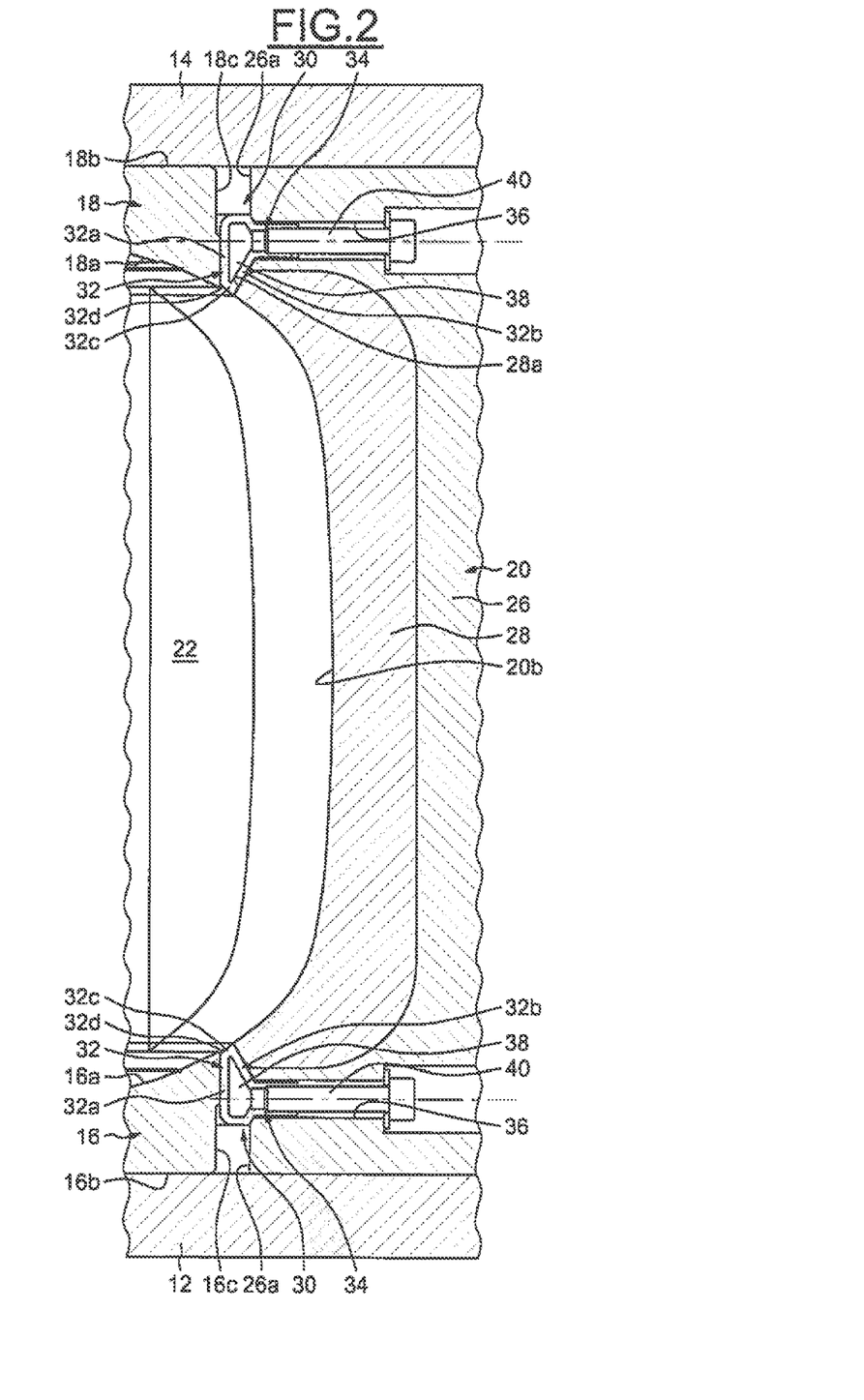
FIG. 2 is a detail view of FIG. 1.

As illustrated more clearly in FIG. 2, each spacing part 32 comprises an axial inner wall 32a that comes radially into contact with an axial outer end face 16c, or 18c, of the associated shell in the closed position of the mold. The end face 16c, or 18c, of the shell radially delimits, on the outer side, the internal and external faces 16a and 16b, or 18a and 18b.

Each spacing part 32 also comprises an outer wall 32b which is radially on the opposite side from the inner wall 32a and mounted so as to bear radially against an inner end face of the associated sector 20. The inner end face radially faces the outer end face 16c, or 18c, of each shell, remaining at a distance from the latter. The outer wall 32b is mounted so as to bear radially against an axial inner end face 26a of the support 26 and against a frustoconical inner end face 28a of the mold fitting 28. The end faces 26a, 28a form the inner end face of the sector.

Each spacing part 32 also comprises an internal wall 32c connecting the inner wall 32a and outer wall 32b, and delimiting a contact face 32d provided to bear against the tire in the closed position of the mold 10. The contact face 32d focally extends the inner face 20b of the associated sector and the associated internal face 16a, or 18a, of the shells.

Each spacing part 32 internally delimits an empty cavity 38 with a curved shape that extends along the entire length of said part. The cavity 38 is delimited in the radial direction by the inner wall 32a and outer wall 32b. The cavity 38 is formed in the radial thickness of the spacing part 32. The spacing part 32 has a curved hollow overall shape.

As illustrated more clearly in FIGS. 3 and 4, each spacing part 32 is delimited in the circumferential direction by two opposite end walls (not referenced). The end walls delimit the cavity 38 in the circumferential direction. In the closed position of the mold 10, each end wall of a spacing part 32 is mounted so as to bear against one of the end walls of the immediately adjacent spacing part 32. In this position, the spacing means 30 are positioned end-to-end in the circumferential direction and the spacing parts 32 delimit the lower and upper rings interposed between the sectors 20 and the shells 16, 18. In the closed position of the mold 10, there is a slight circumferential clearance between two adjacent supports 26 and the mold fittings 28 bear against one another in the circumferential direction.

Each fastening part 34 extends substantially radially towards the outside from the associated spacing part 32. Each fastening part 34 has a tubular shape with a circular section and opens into the cavity 38 in the spacing part 32. In the exemplary embodiment illustrated, each spacing means 30 comprises three fastening parts 34. One of the fastening parts 34 is situated substantially in the middle of the spacing part 32 and the two other fastening parts 34 are each situated in the vicinity of one of the end walls of said spacing part. Each fastening part 34 is accommodated inside one of the through-holes 36 provided in the associated sector 20. Each bole 36 extends substantially radially from the outer face 20a of the associated sector and opens onto the inner end face 26a of the support. The holes 36 of each sector are identical.

The mold 10 also comprises a plurality of fastening screws 40 that are each mounted inside one of the holes 36 of the sectors and inside the associated fastening part 34 of the spacing means. Each fastening part 34 internally comprises a thread for immobilizing the spacing means 30 on the sectors 20 via the screws 40. Three screws 40 are provided for fastening each spacing means 30 to the associated sector 20. For each sector 20, the two spacing means 30 keep the mold fitting 28 on and fasten it to the support 26 of said sector.

In the closed position of the mold 10, the sectors 20 are kept spaced apart from the shells 16, 18 in the radial direction by way of the spacing means 30. The shells 16, 18 and the sectors 20 are in contact in the radial direction only by way of the spacing means 30. In this molding position of the tire, no direct radial contact exists between the shells 16, 18 and the mold fitting 28 and the support 26 of each sector. For each sector 20, each of the two associated spacing means 30 is interposed between one of the two shells 16, 18, for the one part, and the mold fitting 28 and the support 26 of said sector, for the other part.

The production of the spacing means 30 from a thermally insulating material which has a thermal conductivity lower than the thermal conductivities of the materials of the shells 16 and 18, of the mold fitting 28 and of the support 26 makes it possible to reduce the heat transfer by conduction that exists between the shells 16, 18 and the sectors 20 of the mold during the curing of the tire.

During curing, the two shells 16, 18 of the mold can be heated to a temperature different from that to which the sectors 20 are heated. In the closed position of the mold 10, the spacing means 30 make it possible to reduce heat exchanges inside the mold so as to keep the thermal difference provided between the shells 16, 18 and the sectors 20 substantially constant in this way, the curing of the tire is optimized.

In this embodiment, the spacing means 30 are made entirely of a material having a thermal conductivity lower than that of the materials of the sectors and of the shells. In one variant embodiment, it may be conceivable to produce each spacing means from several materials, for example from a first thermally insulating material as defined above for the spacing part, and from a second material that can be metal for the fastening parts.

In the exemplary embodiment described, the spacing parts 32 of the spacing means 30 are hollow so as to further limit heat exchanges between the shells 16, 18 and the sectors 20 of the mold by the presence of air. Alternatively, it may, however, be possible to provide spacing parts with a solid section.

Figure 5:
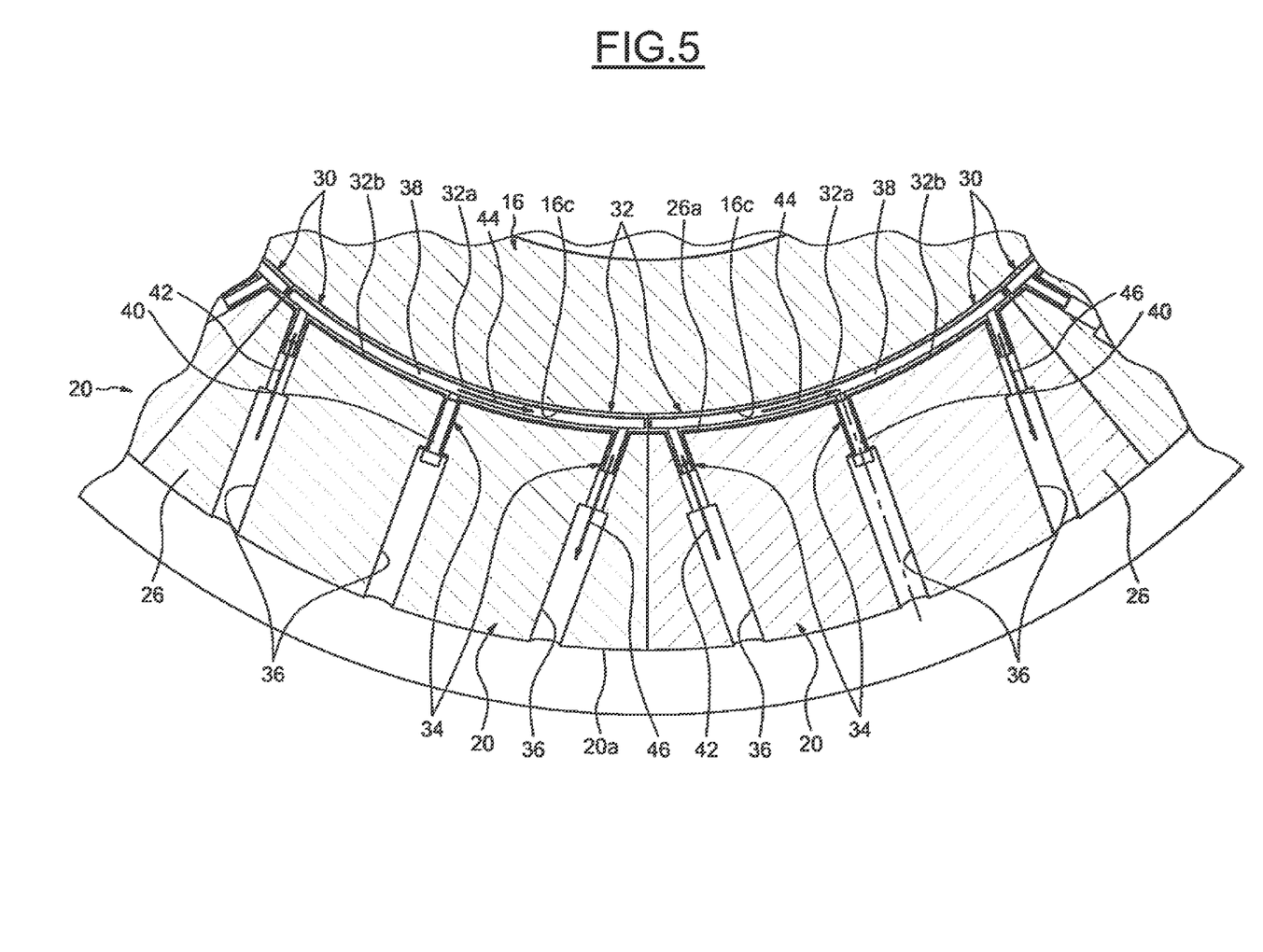
FIG. 5 is a detail view in cross section of a sectored mold according to a second exemplary embodiment of the invention in a closed position of said mold.

The exemplary embodiment illustrated in FIG. 5, in which identical elements bear the same references, differs in that each spacing means 30 is fastened to the associated sector 20 by way of a single fastening screw 40. The screw 40 is situated in the middle of the associated spacing means 30. For each spacing means 30, the two fastening parts 34 that are left free are attached to supply and outlet ducts (not shown) of the mold 10 so as to obtain the flow of a cooling fluid inside and along the cavity 38 of said spacing means. Each of the supply and outlet ducts is mounted inside the associated fastening part 34 of the spacing means and of the corresponding hole 36 of the sector 20. The flow of the cooling fluid inside each sector 20 and inside each associated spacing means 30 is illustrated schematically by the arrows referenced 42 to 46.

With a flow of the cooling fluid inside each spacing means 30, heat transfers that can occur between the shells 16, 18 and the sectors 20 of the mold during the curing of the tire are limited. In this variant embodiment, each spacing means 30 can be made of a thermally conductive material, notably of steel, of aluminium, etc. In order to further limit the heat transfers between the shells 16, 18 and the sectors 20 of the mold in the closed position, each spacing means 30 can be made of a thermally insulating material as defined in the first exemplary embodiment.

In one variant embodiment, it is possible to provide fluidic communication between the spacing means 30 so as to provide a single fluid supply duct and a single outlet duct mounted on the mold 10. To this end, it may be possible to mount these two ducts on two successive spacing means 30 that each comprise a single end wall mounted so as to bear against the end wall of the other spacing means, and not to provide end walls for the other spacing means 30 so as to form a single circular cavity common to all of the spacing means.

In the exemplary embodiments described, the spacing means 30 are fastened to the sectors 20 of the mold. This disposition is advantageous in as much as it makes it possible to fasten the mold fittings 28 to the supports 26 of the sectors by way of the spacing means 30. Alternatively, it may, however, be possible to provide for the spacing means 30 to be fastened to the shells 16, 18 of the mold.

The present invention has been illustrated on the basis of a mold comprising a single set of sectors for molding the tread of the tire. It is also possible, without departing from the scope of the invention, to provide a mold comprising a set of lower sectors and a set of upper sectors for molding the tread of the tire, wherein the movement of each set of sectors is controlled by a specific clamping ring.

The invention claimed is:

1. A Mold for a tire with a tread and two lateral sidewalls, comprising:
    first and second shells that are intended to mold the lateral sidewalls of the tire,
    a plurality of sectors distributed in the circumferential direction that are intended to mold the tread of said tire, the plurality of sectors being radially movable between an open position and a closed position of the mold,
    wherein a spacing is interposed between each sector and each of the first and second shells in order to keep said sector and the first and second shells spaced apart in the radial direction in the closed position of the mold, and
    wherein the first and second shells and the sectors are in contact in the radial direction only by way of the spacing for, said spacing limiting the heat transfer from the first and second shells to the sectors and vice versa in said closed position of the mold.

2. The Mold according to claim 1, wherein each spacing is made at least in part of thermally insulating material having a thermal conductivity lower than that of the materials of the sectors and of the first and second shells.

3. The Mold according to claim 1, wherein each spacing comprises a spacing part made in the form of a section of a ring, the spacing being disposed such that the spacing parts form at least one ring between the sectors and each of the first and second shells.

4. The Mold according to claim 3, wherein said spacing part internally delimits at least one cavity.

5. The Mold according to claim 4, wherein said cavity is delimited in the radial direction by an inner wall and an outer wall of the spacing part, said walls being mounted in contact with the an associated shell of either the first and second shells and with an associated sector.

6. The Mold according to claim 4, comprising: the cavity is supplied with cooling fluid, and
    an outlet for the fluid is provided so as to obtain a flow of the cooling fluid along said cavity.

7. The Mold according to claim 3, wherein the spacing comprises at least one fastening part extending substantially radially from the spacing part inside a hole formed in an associated one of the sectors or in an associated one of the shells.

8. The Mold according to claim 7, comprising a fastening that is mounted in said hole and extends inside said fastening part.

9. The Mold according to claim 1, wherein each spacing is radially in contact on one side with an associated shell of the first and second shells, and radially in contact on the other side with an associated sector.

10. The Mold according to claim 1, wherein the spacing comprises a contact face for contact with the tire in the closed position of the mold.

11. The Mold according to claim 1, wherein the spacing is made of a metal material or of a composite material.

12. The Mold according to claim 1, wherein each sector comprises a support and a mold fitting fastened to said support.

13. The Mold according to claim 12, wherein the spacing is fastened to the sectors and retain the mold fittings on the supports.

14. The Mold according to claim 1, comprising at least one clamping ring that cooperates with outer faces of the sectors.

15. A Method for molding a tire with a mold,
    providing the mold to mold a tire having a tread and two lateral sidewalls, the mold including:
    first and second shells that are intended to mold the lateral sidewalls of the tire,
    a plurality of sectors distributed in the circumferential direction, the sectors being intended to mold the tread of said tire, the plurality of sectors being radially movable between an open position and a closed position of the mold,
    wherein a spacing is interposed between each sector and each of the first and second shells in order to keep said sector and the first and second shells spaced apart in the radial direction in the closed position of the mold,
    wherein the first and second shells and the sectors are in contact in the radial direction only by way of the spacing,
    said spacing limiting the heat transfer from the first and second shells to the sectors and vice versa in said closed position of the mold, and
    wherein the first and second shells are heated to a temperature different from that to which the sectors of the mold are heated.

* * * * *